3,709,933
NITRILOTRIACETYLTRICHLORIDE

George C. Hopkins, Clarence, and Raymond R. Hindersinn, Lewiston, N.Y., assignors to Hooker Chemical Corporation, Niagara Falls, N.Y.
No Drawing. Filed Dec. 30, 1968, Ser. No. 788,073
Int. Cl. C07c *99/00, 125/00, 125/04*
U.S. Cl. 260—544 Y          9 Claims

ABSTRACT OF THE DISCLOSURE

Nitrilotriacetyltrichloride, a process for preparing said compound by the reaction of nitrilotriacetic acid with phosphorus pentachloride and the utility of said compound as a chemical intermediate.

---

This invention relates to nitrilotriacetyltrichloride and a process for its preparation.

The amino acid halides are known to be readily decomposable substances that are difficult to prepare and work with. Processes are known where acyl chlorides of peptides and α- and β-amino acids are prepared by reaction of phosphorus pentachloride with the acid and the acyl chlorides are crystallized from the reaction mixture. (Journal of the American Chemical Society, volume 76, pp. 2814–2825, Frankel et al.)

It has been found that nitrilotriacetylchloride is produced as a stable product when stored in a dark bottle in the absence of air by a process wherein phosphorus pentachloride and nitrilotriacetic acid are reacted and impurities are extracted with an aqueous liquid. It would be expected that extraction with aqueous liquid would hydrolyze the nitrilotriacetylchloride since most acid halides are readily hydrolyzed. In the present invention, extraction with water removes water soluble impurities in the reaction mixture and results in a product of a high degree of purity.

In accordance with the present invention, there is provided a novel compound, nitrilotriacetyltrichloride, and a process for preparing said compound comprising reacting, at a temperature of about 0 degree centigrade to about 100 degrees centigrade, nitrilotriacetic acid with phosphorus pentachloride in the presence of a non-aqueous liquid and removing the resulting phosphoryltrichloride extraction with an aqueous liquid.

Nitrilotriacetyltrichloride is prepared according to the following equation:

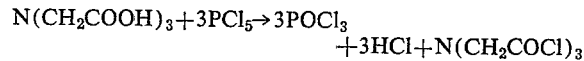

$$N(CH_2COOH)_3 + 3PCl_5 \rightarrow 3POCl_3 + 3HCl + N(CH_2COCl)_3$$

The by-product phosphoryltrichloride and hydrochloric acid, excess non-aqueous liquid and excess reactants are removed to give a pure product.

Organic non-aqueous liquids devoid of active hydrogen are suitable liquids for the process of the present invention. Said liquids are preferably aliphatic hydrocarbons, aliphatic ethers and thio ethers of about 1 to about 20 carbon atoms, alicyclic hydrocarbons and heterocyclic hydrocarbons containing oxygen, nitrogen or sulfur, containing a 5 to 7 membered ring or rings and containing about 5 to about 20 carbon atoms, aromatic hydrocarbons of about 6 to about 20 carbon atoms, and the aforementioned compounds substituted with chlorine, bromine, fluorine, iodine or nitro. Typical liquids that may be used in the process of the present invention are diethylether, ethylmethylether, ethyl acetate, methyl propionate, ethyl butyrate, ethyl acetate, propyl acetate, methylmethoxy acetate, methylethoxy acetate, benzene, toluene, carbon tetrachloride, chlorobenzene, hexane, chloroform, 1,1,2-trichloroethane, xylene, dioxane, nitrobenzene, cyclohexane, n-heptane, 2,2,4-trimethylpentane and diisobutylene.

The process of the present invention is preferably carried out in a liquid reaction mixture. Phosphorus pentachloride is soluble in the organic non-aqueous liquid. Under said conditions, the reaction mixture preferably comprises two phases, a nitrilotriacetic acid phase and a non-aqueous liquid phase.

As the reaction proceeds to completion, nitrilotriacetyltrichloride and phosphoryltrichloride are formed. Hydrochloric acid is preferably removed from the reaction mixture as a gas as it is formed. After a reaction period, the reaction mixture is contacted with an aqueous liquid resulting in the absorption by solution and/or hydrolysis of the phosphorotrichloride, remaining hydrochloric acid, excess nitrilotriacetic acid and excess phosphorus pentachloride into the aqueous layer. The resulting mixture comprises substantially nitrilotriacetyltrichloride and non-aqueous liquid.

It has been found that the process of the present invention is useful when the temperature is about 0 degree centigrade to about 100 degrees centigrade, preferably about 50 degrees centigrade to about 70 degrees centigrade.

It has been found that yield is dependent, to some extent, on the reaction period, the length of time that the reactants are in contact. Nitrilotriacetyltrichloride is present in the reaction mixture with a reaction time as small as about one-quarter of an hour. Generally, the yield increases up to about a 24 hour reaction period, after which time an increase in reaction period does not increase the yield but may result in a lower yield due to decomposition of nitrilotriacetyltrichloride. Preferably the reaction period is about one-half hour to about six hours.

It has been found that the process of the present invention is useful when the molar proportions of the reactants are about 0.1 to about 100 moles of phosphorus pentachloride per mole of nitrilotriacetic acid. Molar proportions of about 2 to about 4 moles of phosphorus pentachloride per mole of nitrilotriacetic acid are preferred due to the greater availability of phosphorus pentachloride as compared with nitrilotriacetic acid.

The pressure employed in the reaction may be varied within a wide range without affecting yields. Preferably the pressure is about 0.25 atmosphere to about 3 atmospheres. Obviously, the pressure may affect the physical properties of the non-aqueous liquid employed. The pressure is preferably adjusted to maintain a liquid phase reaction mixture.

Although the aqueous liquid used for extraction may be at any temperature, aqueous liquid at a temperature at about 0 degree centigrade to about 25 degrees centigrade is preferably employed to minimize the decomposition of nitrilotriacetyltrichloride.

The amount of aqueous liquid used for the extraction of impurities from the reaction mixture may be varied within a wide range without substantially decreasing the yield of product. Multiple extraction steps may also be used without decreasing the yield. A volume of aqueous liquid equal to about one-half to about 50 times the volume of the final reaction mixture is used in the extraction, preferably about 1 to 5 times the volume of the final reaction mixture is used.

The process of the present invention is useful when the aqueous liquid comprises about 80 to about 100 percent by weight water. In addition to water, the aqueous liquid may contain metal salts such as sodium chloride, magnesium chloride, potassium nitrate and organic solvents devoid of active hydrogen.

Preferably the solvent is separated from the reaction mixture after the extraction with water. However, the process of the present invention is useful when the solvent is separated from the reaction mixture prior to extraction with water. Preferably the solvent is removed by a process utilizing the different boiling points of the product and solvent, such as evaporation or distillation.

Nitrilotriacetyltrichloride is useful as a chemical intermediate for the preparation of esters by reactions with an alcohol. The triester produced by the reaction of nitrilotriacetyltrichloride and ethyl alcohol, is particularly useful as a pesticide. Furthermore, the esters so produced are known to be plasticizers.

Nitrilotriacetyltrichloride may be reacted with amines to prepare amides. The amide produced by the reaction of nitrilotriacetyltrichloride and ammonia is a stabilizer for polyformaldehyde resins and is used in preparing methylated amides used in textile and paper treatments. Other amide derivatives have utility as lubricants.

Nitrilotriacetyltrichloride is useful for preparing thermosetting polymers by reaction with polyols and polyamines, for instance, by reacting with polyvinyl alcohol or by crosslinking a phenol formaldehyde resin.

The following examples are illustrative of the invention, and are not to be limitative thereof. Unless otherwise stated, parts are by weight and temperatures are in degrees centigrade.

EXAMPLE 1

A mixture of nitrilotriacetic acid (191 parts, 1.00 mole) and phosphorus pentachloride (636 parts, 3.06 moles) in about 700 parts of benzene was heated at 61–63 degrees centigrade for two hours. A clear yellow solution resulted after evolution of 108 parts (2.96 moles) of hydrochloric acid. One-half of the reaction mixture was extracted with ice water, and the temperature was maintained below about 15 degrees centigrade. The benzene layer was separated, dried over magnesium sulfate and flash evaporated at 30–40 degrees centigrade at reduced pressure to give 53 parts (43 percent yield based on nitrilotriacetic acid) of acid chloride as a light pink solid. Purification by recrystallization from n-hexane gave 25 parts (20 percent yield of light yellow to white needles, M.P. 58–60 degrees centigrade with decomposition).

(a) *Elemental analysis.*—Calculated for $C_6H_6Cl_3NO_3$ (percent): C, 29.2; H, 2.45; N, 5.68; Cl, 43.2. Found (percent): C, 28.9; H, 3.00; N, 5.94; Cl, 42.0.

(b) Nuclear magnetic reasonance: A single sharp peak at 3.06 p.p.m.

(c) Nitrilotriacetylchloride was converted to nitrilotriacetic acid in a theoretical yield by reaction with water.

EXAMPLE 2

Nitrilotriacetyltrichloride was converted to triethyl nitrilotriacetate by the reaction with dry ethanol. Nitrilotriacetyltrichloride (1.33 parts) was dissolved in about 32 parts of ethanol at room temperature. An exothermic reaction ensued. After ten minutes the solvent was evaporated to give 1.41 parts of white solid identified as the hydrochloride of the ester. The solid was dissolved in distilled water and neutralized with sodium bicarbonate at which time an oily layer separated. The latter was extracted with diethyl ether. Evaporation of the ether gave 0.491 part of triethyl nitrilotriacetate (31 percent yield) which are identified by comparison of its infrared spectrum with authentic material prepared by direct esterification of nitrilotriacetic acid.

While there have been disclosed various embodiments of the invention, these are not to be understood as limiting the scope of the invention, as it is realized that changes therein are possible. It is intended that each element recited by any of the claims is to be understood as referring to all equivalent elements for accomplishing substantially the same results in substantially the same or equivalent manner. It is intended to cover the invention broadly, in whatever form it may be utilized.

We claim:
1. Nitrilotriacetyltrichloride.
2. A process for preparing nitrilotriacetyltrichloride which comprises reacting, at a temperature of about 0 degree centigrade to about 100 degrees centigrade, nitrilotriacetic acid with phosphorus pentachloride in the presence of a non-aqueous liquid selected from the group consisting of halogen and nitro substituted or unsubstituted aliphatic hydrocarbons, aliphatic ethers of from about 1 to about 20 carbon atoms, aliphatic thio ethers of from about 1 to about 20 carbon atoms, alicyclic hydrocarbons containing oxygen, nitrogen or sulfur of from about 5 to about 20 carbon atoms, heterocyclic hydrocarbons containing oxygen, nitrogen or sulfur of from about 5 to about 20 carbon atoms, aromatic hydrocarbons of from about 6 to about 20 carbon atoms and mixtures thereof, and treating the reaction mixture with an aqueous liquid comprising about 80 to about 100 percent by weight water, to remove phosphoryltrichloride.
3. A process in accordance with claim 2, wherein about 0.1 to about 100 moles of phosphorus pentachloride are used per mole of nitrilotriacetic acid.
4. A process in accordance with claim 1, wherein nitrilotriacetyltrichloride and phosphorus pentachloride are reacted for a period of about one-quarter of an hour to about 24 hours.
5. A process in accordance with claim 2 wherein the reaction pressure is about 0.25 atmosphere to about 3 atmospheres.
6. A process in accordance with claim 2 wherein the aqueous liquid of the water treatment step is at a temperature of about 0 degree centigrade to about 25 degrees centigrade.
7. A process in accordance with claim 2 wherein the non-aqueous liquid is removed after the aqueous liquid treatment step.
8. A process of claim 7 wherein the non-aqueous liquid is removed by evaporation, after the water treatment step.
9. A process in accordance with claim 7 wherein the non-aqueous liquid is removed by distillation, after the water treatment step.

References Cited

UNITED STATES PATENTS 3,364,258 1/1968 De Jong _____ 260—543
3,393,234 7/1968 Wollensak _____ 260—534

OTHER REFERENCES

March: Advanced Organic Chemistry, pp. 346 and 347.

LORRAINE A. WEINBERGER, Primary Examiner

R. D. KELLY, Assistant Examiner

U.S. Cl. X.R.

260—45.9, 57 R, 75 N, 75 H, 482 B, 482 C, 561 A; 424—300